US009706271B2

(12) United States Patent
Loos (10) Patent No.: US 9,706,271 B2
(45) Date of Patent: Jul. 11, 2017

(54) CURRENTLESS OPTICAL SWITCH (71) Applicant: Guy Loos, Bivange (LU)

(72) Inventor: Guy Loos, Bivange (LU)

( * ) Notice: Subject to any disclaimer, the term of this patent is extended or adjusted under 35 U.S.C. 154(b) by 14 days.

(21) Appl. No.: 14/407,617

(22) PCT Filed: Jun. 12, 2013

(86) PCT No.: PCT/EP2013/062108
§ 371 (c)(1),
(2) Date: Dec. 12, 2014

(87) PCT Pub. No.: WO2013/186245
PCT Pub. Date: Dec. 19, 2013

(65) Prior Publication Data
US 2015/0172792 A1 Jun. 18, 2015

(30) Foreign Application Priority Data

Jun. 12, 2012 (LU) .......................... 92020

(51) Int. Cl.
H04B 10/08 (2006.01)
H04Q 11/00 (2006.01)
(Continued)

(52) U.S. Cl.
CPC .......... *H04Q 11/0005* (2013.01); *G02B 6/35* (2013.01); *G08B 13/1481* (2013.01);
(Continued)

(58) Field of Classification Search
CPC ...... H04B 10/071; G02B 6/35; G02B 6/3536; G02B 6/3552; G02B 6/4469; H04Q 11/0005; G08B 13/1481
(Continued)

(56) References Cited

U.S. PATENT DOCUMENTS 5,330,136 A * 7/1994 Colbaugh ................. B61L 1/06
246/122 R
6,310,702 B1 * 10/2001 Minami ............... H04B 10/071
356/73
(Continued)

FOREIGN PATENT DOCUMENTS

EP 2725724 4/2014
JP 2000329861 A 11/2000
(Continued)

OTHER PUBLICATIONS

International Search Report issued Oct. 8, 2013 re: Application No. PCT/EP2013/062108; citing: WO 2004/100095 A2, US 2009/040046 A1, US 2006/071770 A1 and JP 2001 194115 A.
(Continued)

Primary Examiner — M. R. Sedighian
(74) Attorney, Agent, or Firm — Cantor Colburn LLP (57) ABSTRACT The invention relates to a switch that can be checked, which comprises a housing, an optical conductor (10) arranged in the housing, a deflecting device (16) for the optical conductor, which deflecting device is arranged in the housing, and a triggering device, which initiates a switching process of the switch and actuates the deflecting device at least at times. The deflecting device is designed in such a way that, when the deflecting device is actuated, the optical conductor is deflected in a defined manner such that the bending radius of the optical conductor changes in a defined manner. According to the invention, the switch that can be checked also has a restoring mechanism (34) for the deflecting device, and the restoring mechanism has a restoring delay, which returns the deflecting device to the original position of the deflecting device with a defined delay after the triggering device has been restored.

10 Claims, 5 Drawing Sheets (51) Int. Cl.
G02B 6/35 (2006.01)
G08B 13/14 (2006.01)
H04B 10/071 (2013.01)
G02B 6/44 (2006.01)

(52) U.S. Cl.
CPC ......... *H04B 10/071* (2013.01); *G02B 6/3536* (2013.01); *G02B 6/3552* (2013.01); *G02B 6/4469* (2013.01)

(58) Field of Classification Search
USPC .................................. 398/21, 33, 45, 19, 13
See application file for complete search history.

(56) References Cited

U.S. PATENT DOCUMENTS

| 7,109,873 | B2 | 9/2006 | Giotto et al. |
| 7,221,906 | B2 * | 5/2007 | Lim ................. H04B 10/25755 398/116 |
| 2006/0071770 | A1 | 4/2006 | Giotto et al. |
| 2009/0040046 | A1 * | 2/2009 | Browning, Jr. ...... G08B 13/186 340/552 |

FOREIGN PATENT DOCUMENTS

| JP | 2001194115 A | 7/2001 |
| WO | 2004100095 A2 | 11/2004 |

OTHER PUBLICATIONS

International Preliminary Report on Patentability issued Aug. 12, 2014 re: Application No. PCT/EP2013/062108; citing: WO 2004/100095 A2, US 2009/040046 A1, US 2006/071770 A1 and JP 2001 1941 15 A.

Europe Office Action for European Patent Application No. 13727940.2; OA Transmittal Date Oct. 27, 2016; 5 pages.

* cited by examiner

Fig 5

CURRENTLESS OPTICAL SWITCH

TECHNICAL FIELD

The present invention generally relates to a currentless, optical switch that transmits a switching status. This switch can be used in all applications where a switching status needs to be transmitted currentless. It can be used for monitoring access shafts or doors, for telecommunication infrastructures, for gas, water, sewage and power supply as well as for securing the shafts and doors of drinking water reservoirs or distributors as well as security infrastructures and security access systems of civil and military areas. Furthermore, the invention describes a device that enables reliable detection of multiple switches.

BACKGROUND OF THE INVENTION

The objective is to develop a mechanical, currentless and optical switch that can be used wherever access to key infrastructures needs to be secured respectively monitored. In addition to telecommunication shafts, such key structures include shafts and access doors of gas, water and power supply that must be secured against unauthorized access. Such shafts are often located underground and are closed by a shaft cover. The multi-purpose switch should be installed in the shafts to monitor the opening status of the respective shaft cover.

In addition, the switch should also make it possible to monitor the accesses to technical or high-security rooms or containers and also, in combination with a float valve, to indicate the flooding of a shaft or a building level for instance.

U.S. Pat. No. 7,109,873 B2 mentions a switch that can be used to detect the opening of a shaft cover. In one embodiment of this switch, a movable pin in the switch is pre-tensioned with a spring and presses from the inside against the closed shaft cover. When the shaft cover is opened, the pin moves and bends an optical conductor (glass fiber) that is fixed on the pin. Alternatively, magnets can be used to trigger the bending of the optical conductor (glass fiber) when the shaft cover is opened. To that end, it is necessary to fix a first magnet on the shaft cover, this magnet attracts a second magnet, which is pre-tensioned with a spring, when the shaft cover is closed. When opening the shaft cover, the pre-tension is neutralized and the switch triggers. When the switch is triggered, a glass fiber is deflected and bent by a taper pin that is coupled with the second magnet.

The bending (buckling) of the optical conductor is recorded by a measuring device on the basis of the optical time-domain reflectometry (OTDR). For this purpose, an OTDR measuring device is connected to the optical conductor, which sends per measurement a light pulse through the optical conductor and measures the intensity of the back-scattered light over time. If a bending in the optical conductor exists, the total reflection of light is compensated in the optical conductor and light exits from the optical conductor. The measurement of the back-scattered light over time cannot only be used to determine the magnitude, but also the location at which the light intensity is lost due to temporary damping. Since the measurement is a pulsed measurement that sends light pulses at different time intervals and since the glass fiber requires a certain time to go back to the initial position, the switching status of the switch cannot be checked in the time between two light pulses. If the switch is triggered only for a very short time, then the triggering is not reliably detected.

BRIEF SUMMARY

The invention develops a currentless optical switch that allows a reliable detection of the triggering irrespectively of the temporal duration of the respective triggering.

The invention deals in particular with a switch that transmits a switching status purely mechanically and without any current using an optical conductor such as, for instance, a glass fiber serving as transmission medium. The term 'switch' may also be understood as a switching device as well as a multi-purpose switch. The system advantageously uses the properties of light-conductive, bending-sensitive optical conductors and especially the fact that the light exits at the buckling or bending point when such optical conductors are bent or buckled.

The interrogatable switching device according to the invention comprises a housing, as well as an optical conductor arranged in the housing and a deflecting device for the optical conductor arranged in the housing. The switching device also comprises a triggering device that triggers a switching operation of the switching device and actuates the deflecting device at least temporarily. The deflecting device is configured such that the optical conductor is deflected in a defined manner when the deflecting device is actuated such that the bending radius of the optical conductor changes in a defined manner. The interrogatable switching device further comprises a resetting mechanism for the deflecting device, the resetting mechanism comprising a delay element which returns the deflecting device to the initial position of the deflecting device with a defined delay after the resetting of the triggering device.

According to a preferred embodiment of the invention, the optical conductor inside the switch is guided along a catch that is arranged on a movable slider. When the trigger mechanism is actuated, the catch deflects the optical conductor from its idle state position, whereby the resultant bending of the conductor causes a temporary damping of the light conductivity and reflection capability of the optical conductor. This damping is recorded by a measuring device and the corresponding information is sent to a geo-referenced evaluation program that determines the exact location of the concerned switch. In principle the switch according to the invention can be used in every environment for transmitting a switching status. Since the switch according to the invention does not lead to the generation of frictional heat or sparks, its usage in highly-explosive or highly inflammable, resp. highly corrosive environments is recommended. Since the switch according to the invention functions without current, it is most-suited for usage at locations where supply of current is problematic. Moreover, no magnets are not used, which is why the switch is insensitive to magnetic fields. Also omitted is the combination of expensive TK modules such as GSM or GPRS, which are susceptible to disturbances, and which can be sabotaged using interfering devices (e.g. frequency jammers).

The resetting of the triggering mechanism preferably occurs via a delay which ensures that the triggering is recorded by the measuring device. This delay element has 2 more important advantages: 1) it allows multiple star-shaped fiber strands (whereby a fiber strand designates an optical conductor, as well as the switches operationally coupled with it) to be recorded sequentially and with only one measuring device; 2) short switching sequences are reliably recorded thanks to the delay element.

It should be noted that the switch according to the invention can be designed simply such that a binary switching status is transmitted. In this case, it will be differentiated only between two statuses "0" (switch in the idle position) and "1" (switch triggered). In case of such a "binary" switch, the fiber is mechanically brought to the initial position in fractions of a second after the resetting time has expired. This leads to the binary switching status: open or closed. In an alternative embodiment, the switch can also be configured such that a gradual resetting over time can be detected. Indeed, it can be interesting depending on the application, to measure or record the transition from status "0" to status "1" or from status "1" to status "0" over time, i.e. with changing damping values.

The switch according to the invention is water-tight and its heavy-duty version for outdoor usage has at least IP 68 protection and is impact-resistant at least up to an impact force of 10 Joule.

In an alternative embodiment, the switch can be triggered using a remote trigger such as for instance a Bowden cable with a fixed wire. Therefore, the physical proximity between the switch and the shaft cover, in the case of a shaft cover monitoring system, is not absolutely necessary.

In a preferred embodiment, the switch is built such that it is not sensitive to sabotage. In case of sabotage attempts, the switch triggers automatically. The present switch also triggers instantaneously in case of material defect. A material defect can be e.g. the breakage of a defective glass fiber in the switch, which is also recognized as "breakage". Thus, the switch also fulfils a self-test function thanks to its high reliability: the switch is 100% functional when not triggered.

The recommended switch is maintenance-free and has a range of application between −20° and +40° Celsius. This temperature range can also be extended depending on the switch design.

According to a preferred embodiment of the invention, the optical conductor is guided within the housing along a circular track by guiding elements. In the non-actuated status, the bending radius with which the optical conductor is guided within the housing is greater than or equal to the minimum bending radius of the optical conductor. This ensures a compact housing design of the switch. The deflecting device comprises a catch that deflects the optical conductor in a defined direction when the deflecting device is actuated such that the bending radius of the optical conductor is temporarily reduced at least at one point. In the actuated status, the bending radius of the optical conductor arranged in the deflecting device is less than the minimum bending radius of the optical conductor.

Moreover, the delay element can be designed either as a clockwork or as a hydraulic multi-disc brake. The term 'hydraulic multi-disc brake' indicates a braking device having a disc package with at least two braking surfaces that are pressed on each other in a highly viscous liquid. Compared to a conventional friction brake, such a brake has the advantage that the resetting movement requires a considerable longer time. Thus, longer delay times can be achieved, which is of advantage in complex network topologies.

The optical conductor can be inserted in the housing such that it enters the housing and exits the housing again. Therefore, the optical conductor can be laid through several switches (similar to the arrangement of a conventional series connection). An OTDR measuring device is connected at least to one end of the fiber for reading out the fiber strand. Thanks to this arrangement of switches along a fiber strand, switching statuses of for instance up to 12 switches can be reliably monitored for every fiber strand, whereby the installation costs of such a device can be considerably reduced.

According to a preferred arrangement of optical conductor and switches, the optical conductor is inserted into the housing such that it enters into the housing and ends within the housing. The optical conductor arranged in the housing ends with a LC/PC plug or a plug designed as a reflector. In this arrangement, the operational coupling of the switches is made possible using a beam splitter that is provided before each switch e.g. in a sleeve. Each beam splitter branches off a specific part of the light quantity of the optical conductor and forwards it to the switches. Thanks to such an arrangement, the light quantity is distributed favorably amongst the switches. Therefore, the switching statuses of more than 150 switches can be reliably read out per optical conductor depending on the performance of the OTDR measuring device, which in turn also reduces installation costs further. The temporary damping caused due to the fiber bending in a switch does not influence the measurement recording of the remaining switches.

In order to increase the security, multiple OTDR measuring devices, preferably two OTDR measuring devices, can be used, whereby one OTDR measuring device measures in an anti-cyclic manner and is insofar synchronized with the second measuring device so as to ensure that two devices never measure the same fiber strand.

It must also be noted that in case of a fiber breakage, e.g. between switch 7 and switch 8 of a fiber strand, the measuring device that measures from switch 1 becomes "blind" from switch 7 onwards. A measurement from the opposite direction is not possible since the beam splitters function only unidirectionally. In order to measure all switches of a fiber strand despite a fiber breakage, it is advantageous when by means of a second measuring device a second "parallel" fiber in the opposite direction can be measured. In this case, the second fiber must pass through each switch or connect to the respective switches via a beam splitter in each sleeve. The measurement in the opposite direction in the second fiber also allows a reading in those switches that are downstream to the fiber breakage when viewed from the first measuring device.

DESCRIPTION OF THE FIGURES

Different embodiments of the invention are described with reference to the attached figures.

DETAILED DESCRIPTION OF THE FIGURES

Functioning principle: A bending-sensitive glass fiber, e.g. of type G652, is inserted into the switch according to the invention and is guided around a movable catch under consideration of the minimum bending radius of the respective types of fiber. When a switch is actuated [e.g. due to the lifting of a shaft cover that is connected with the triggering mechanism], the glass fiber is buckled or bent by the movable catch. As a result, the total reflection of light in the glass fiber is compensated and light exits from the glass fiber. This missing light can be measured using a special OTDR measuring device (optical time-domain reflectometer) and uniquely associated to a specific switch using a software. In the back-scattering curve, every switch delivers a characteristic signal peak whose position is determined using the section length between the switch and the OTDR measuring device. When building a network of switches and the beam splitters assigned to them, a characteristic overall image (comparable with a finger print) is obtained by the superimposition of the individual peaks. the overall image is recorded and saved when commissioning the switch network and is used as a reference image for every subsequent measurement. Glass fibers are reset mechanically using a catch that moves glass fibers back to their initial position.

Figure 1:
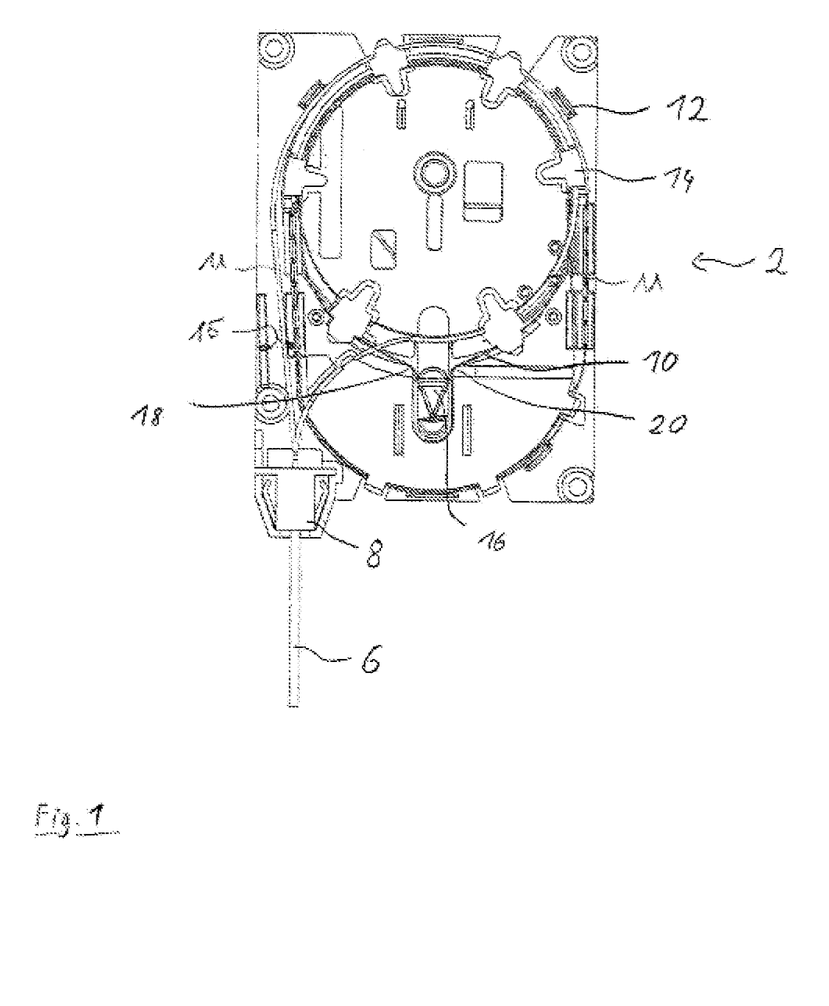
FIG. 1 is a schematic section of the first level of a preferred embodiment of a switch.
Figure 2:
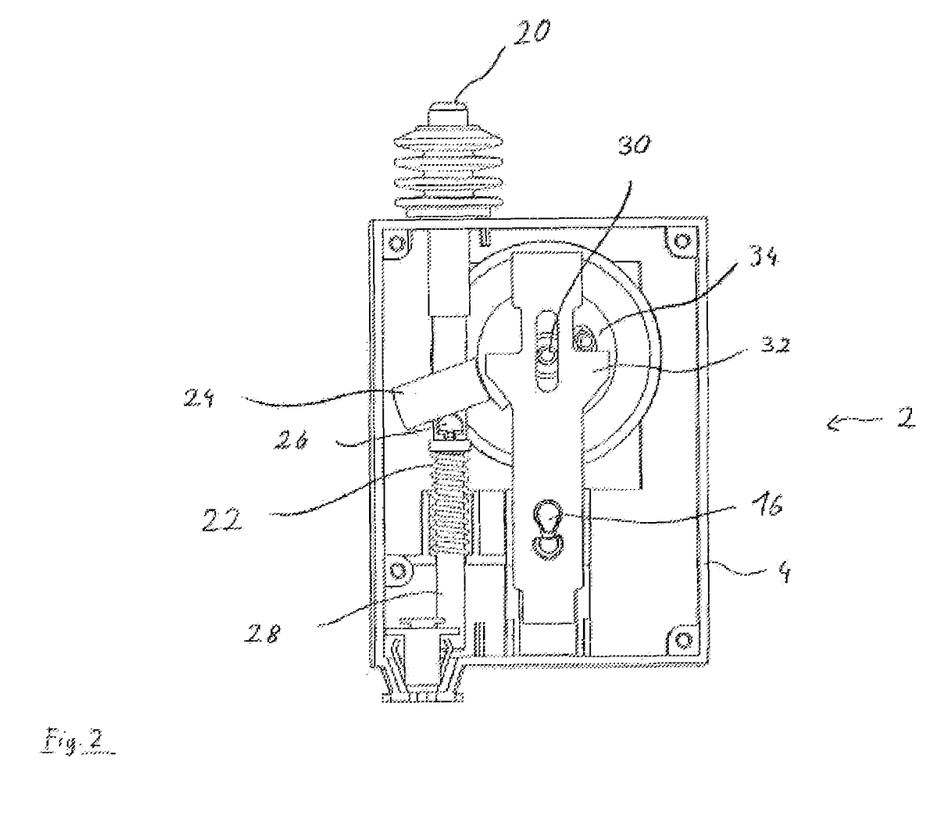
FIG. 2 is a schematic section of the second level of a preferred embodiment of a switch.
Figure 3:
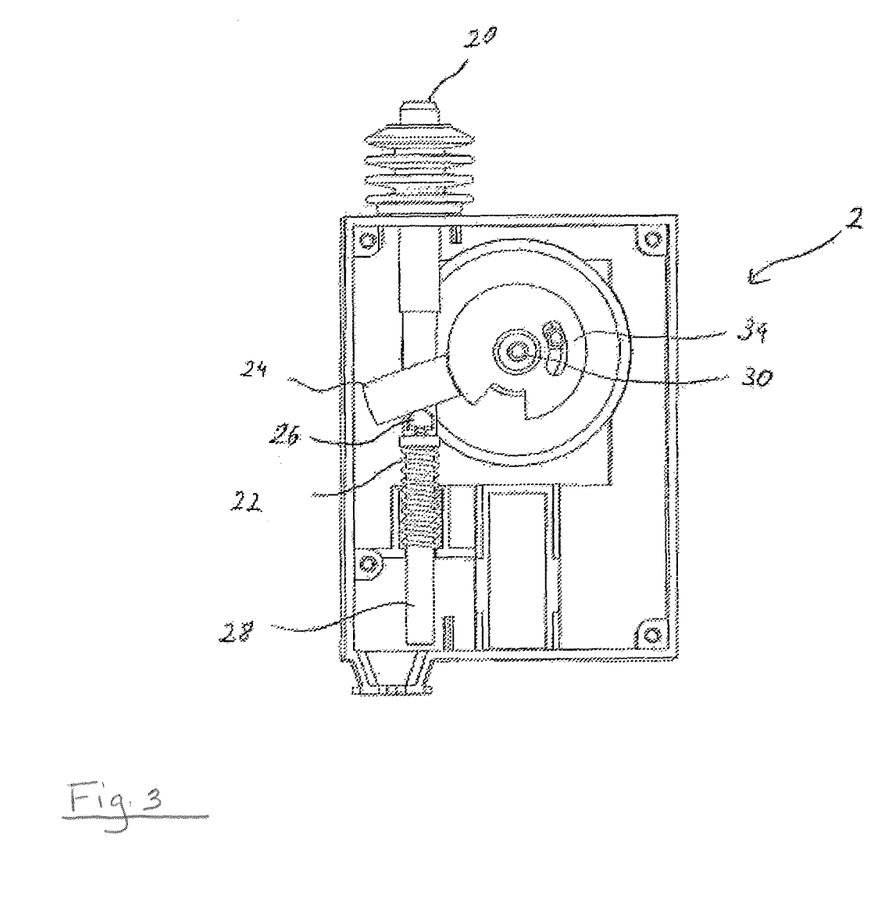
FIG. 3 is a schematic section of the third level of a preferred embodiment of a switch.

FIGS. 1, 2 and 3 show a preferred switch 2 that is represented in the triggered status. Housing 4 of this switch 2 could, via a layered arrangement of the mechanism inside the switch in multiple levels, be designed compactly. FIG. 1 corresponds to the first level of switch 2, in which a bending-insensitive glass fiber 6 of type G657 or G652, G655 or a fiber compatible with the G652 standard is relieved against pull using terminal 8 and is spliced with a bending-sensitive glass fiber 10 of type G652 inside housing 4. Bending-sensitive glass fiber 10 is supported by guiding elements in multiple loops in the housing. Guide strips 12 and guide noses 14 ensure a stable guiding of glass fibers and the adherence to (maintain) the minimum-bending radius. A crimp splice protection protects the splice and is clamped in a longitudinal groove between two cross-pieces in switch 2. One of the loops of bending-sensitive glass fiber 10 is guided past catch 16 of the deflecting device; when the switching operation is triggered, the catch deflects glass fiber 10 downwards and bends it by an angle of approximately 90° at two rounded edges 18, 20 of housing 2.

The triggering and deflecting device shown in FIG. 2 is arranged in the second level of switch 2. The triggering device is designed as pressure switch 20 that is triggered when for instance a shaft cover secured by switch 2 is lifted. As a result of this triggering, screw spring 22 is relieved and lifting lever 24 is actuated by protrusion 26 of lifting rod 28. Lifting lever 24, which can rotate around axis 30, uses pin 25 to actuate slider 32 on which catch 16 is installed. At the same time, lifting lever 24 triggers delay element 34 that resets catch 16 only after a predefined and configurable time. This ensures that even a short actuation of lifting rod 28 is detected as a trigger. Without delay element 34, lifting the shaft cover and shortly after lowering it again [within seconds or even shorter time intervals] would suppress lifting rod 28, compress screw spring 22 and immediately reset the deflecting device to the initial position. It would be technically almost impossible to measure the triggering efficiently and cost effectively.

FIG. 3 shows the level in which delay element 34 is arranged. As described before, delay element 34 fulfils the purpose of delaying the resetting of switch 2 such that the triggering can be recorded by a measuring device without any ambiguity. Thereby the delay time can be set individually. The delay mechanism can be designed as a clockwork or a spring-operated disc package that moves in a highly viscous and temperature-insensitive liquid which serves as a braking aid.

Measurements are sequentially recorded by one and the same measuring device (this is the reason why delay element 34 is required). Measurements of sections having a length of up to 80-90 km are thus possible. Measurements are recorded in a star shape in case of complex network topologies. The number of possible switches per fiber strand depends on the resolution and the dynamics of the measuring device and the intrinsic damping of the fiber strand. The sequential or star-shaped measurement reduces the number of measuring devices required and therefore total monitoring costs. The delay mechanism is also used for the self-inspection of a switch since a defect in the delay element also triggers the switch.

Switch 2 can also be provided with a float valve and used as pressure, level or flood detector. In this case, the delay element can be omitted or bypassed depending on the area of application.

Figure 4:
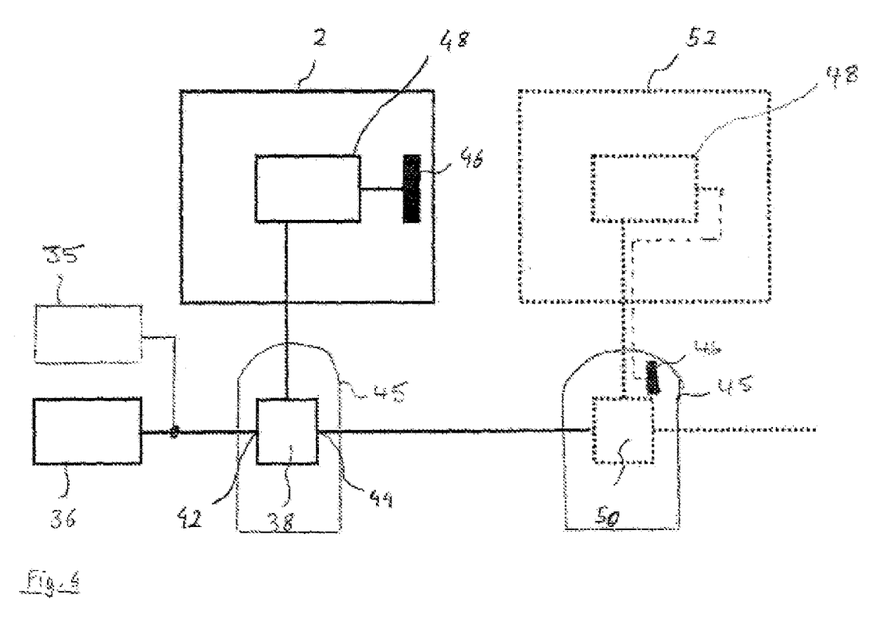
FIG. 4 is the first schematic representation of a preferred arrangement of beam splitters, switches and measuring device.
Figure 5:
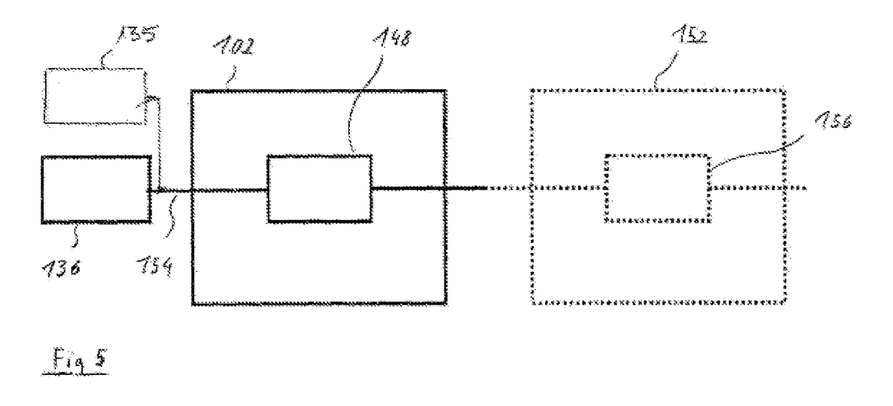
FIG. 5 is the second schematic representation of a possible switch arrangement.

Different switch arrangements are schematically shown in FIGS. 4 and 5. The fiber strand in FIG. 4 connects the OTDR measuring device 36 or the redundant OTDR measuring device 35 with the first switch 2 via beam splitter 38. Beam splitter 38 branches off 3% of light quantity at input 42 and forwards it to the glass fiber of the first switch 2. The quantity of light to be branched is preferably selected such that the bending of the glass fiber can be reliably detected by deflecting device 48. The glass fiber arranged in switch 2 ends in the housing and the light quantity is reflected with a reflector 46 at the end of the glass fiber. The reflection is achieved either through a 90° section of the glass fiber or an open PC connector (e.g. LC/PC plug) or using an open plug that is designed as a reflector. The plug can be clamped between discs 15 in switch 2 and also provided next to beam splitter 50 in sleeve 45. Arranging the plug in sleeve 45 is advantageous since the plug can be replaced without opening the water-tight switch in case of a problem.

The remaining 97% of the light quantity is forwarded to output 44 of a glass fiber and can be used for reading other switches. Analogous to the arrangement of first beam splitter 38 and switch 2, the fiber strand can be continued with other beam splitters and switches (as shown by dashed lines in the representation of beam splitter 50 and switch 52 in FIG. 4) until the light quantity is no longer adequate to detect a triggering of switches reliably.

As compared to a simple series of connections without beam splitters, this arrangement has the following advantages:
  Faster measurement/inspection of switch statuses [approximately 20 seconds for 50 switches] due to better utilization of available light quantity,
  No need of developing any other software for correcting the measurement curve of the triggering switch, and
  Easy identification of the triggered switch.

The light damping caused due to the fiber bending in a switch does not influence the inspection of remaining switches.

The connection with the sleeve is preferably established using a water-tight connector [e.g. a flexible pipe] containing a bending-insensitive glass fiber of type G657. This ensures that when the fiber connection of the switch is buckled between the switch output and the splice cassette in the sleeve, no incorrect switching status occurs. The connector can however also be established using a glass fiber of type G652 or G655 or any glass fiber that is compatible with the G652 standard.

An alternative arrangement of switches 102, 152 along a fiber strand is schematically shown in FIG. 5. Glass fiber 154 connects the OTDR measuring device 136 or the redundant OTDR measuring device 135 with deflecting devices 148 and 156 of corresponding switches 102, 152. Switches 102 and 152 are connected in series. The switching arrangement can be complemented by arranging additional switches along the fiber strand as for instance indicated by switch 152 (shown in dashed lines).

The invention claimed is:

1. A device for detecting a switching operation with at least one interrogatable switching device operationally coupled to an optical fibre strand and at least one OTDR measuring device operationally coupled to said optical fibre strand, wherein the at least one interrogatable switching device comprises:

a housing, an optical conductor arranged in said housing, a deflecting device for the optical conductor arranged in said housing, said deflecting device being configured such that, when the deflecting device is actuated, the optical conductor is deflected such that the bending radius of the optical conductor changes in the defined manner, a triggering device configured for triggering a switching operation of the switching device and actuating the deflecting device at least temporarily, and a resetting mechanism for the deflecting device, said resetting mechanism comprising a delay element which, after the resetting of the triggering device, returns the deflecting device with a defined delay to an initial position thereof wherein the optical conductor is coupled to the fibre strand via a beam splitter such that a part of a light quantity guided in the fibre strand is branched off by the beam splitter and is forwarded to the switching device, and wherein, in order to detect the switching process, an increased damping due to deflection is detected in the optical conductor by means of said at least one OTDR measuring device.

2. A device for detecting a switching operation according to claim 1, wherein the optical conductor is guided within the housing along a circular track by guiding elements, and wherein the deflecting device comprises a catch that deflects the optical conductor in a defined direction when the deflecting device is actuated such that the bending radius of the optical conductor is changed.

3. A device for detecting a switching operation according to claim 1, wherein the delay element is designed as a clockwork.

4. A device for detecting a switching operation according to claim 1, wherein the delay element is designed as a hydraulic multi-disc brake.

5. A device for detecting a switching operation according to claim 1, wherein the optical conductor arranged in the housing enters the housing at a first location and exits said housing at a second location.

6. A device for detecting a switching operation according to claim 1, wherein the optical conductor arranged in the housing enters the housing and ends within the housing.

7. A device for detecting a switching operation according to claim 1, wherein the optical conductor arranged in the housing ends with a LC/PC plug or a plug designed as a reflector.

8. A device for detecting a switching operation according to claim 1, further comprising an adjustable device for adjusting the bending radius of the optical conductor in the deflection position.

9. A device for detecting a switching operation according to claim 1, wherein multiple interrogatable switching devices of a fibre strand are operationally coupled with each other.

10. The device according to claim 9, wherein a part of the light quantity of the optical conductor of a fibre strand is branched off to each switching device with a beam splitter and is forwarded to the switching device.

* * * * *